April 5, 1955 V. H. HASSELQUIST 2,705,523
HEAT-SEAMING APPARATUS FOR THERMOPLASTIC SHEET MATERIALS
Filed June 29, 1951
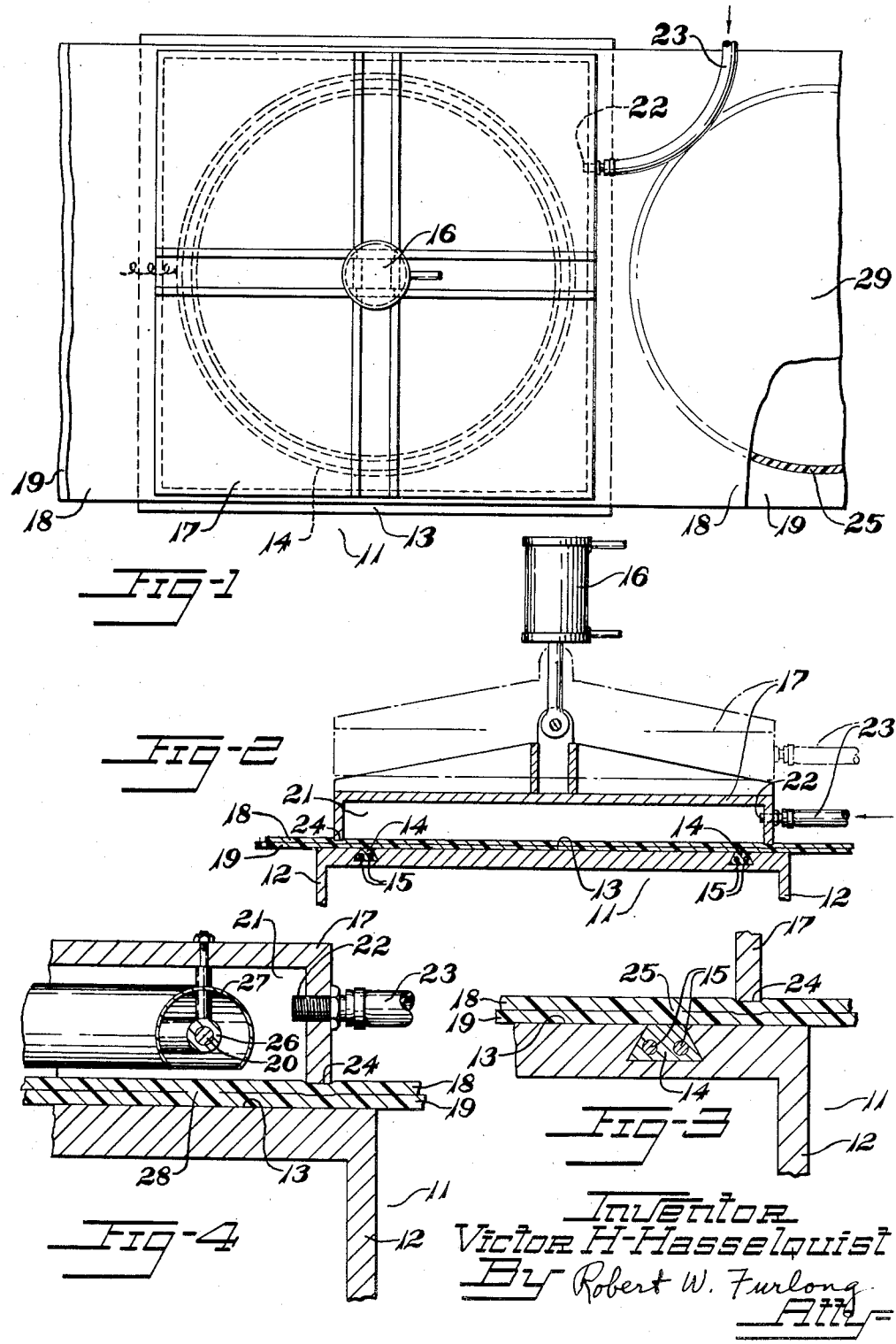
Inventor
Victor H. Hasselquist
By Robert W. Furlong
Atty

United States Patent Office 2,705,523
Patented Apr. 5, 1955

2,705,523

HEAT-SEAMING APPARATUS FOR THERMO-PLASTIC SHEET MATERIALS

Victor H. Hasselquist, Akron, Ohio, assignor to The B. F. Goodrich Company, New York, N. Y., a corporation of New York Application June 29, 1951, Serial No. 234,352

15 Claims. (Cl. 154—42)

This invention relates to heat-seaming apparatus for seaming thermoplastic sheets and particularly to apparatus for forming such a seam having a thickness substantially that of the combined thicknesses of the sheets being joined.

In the past, heated shoes, bars or like members have been brought to bear with considerable pressure upon two or more sheets or thicknesses of thermoplastic material to be seamed together resulting in a thin seam which is greatly reduced in thickness as compared to the original combined thicknesses of the sheets. The resulting thin seam has insufficient strength for most purposes, and at times the shoes actually cut through the material being seamed which, of course, results in no seam at all.

It is an object of this invention to provide a seam joining two or more thin sheets of thermoplastic material, the seam being substantially the same thickness as the combined thicknesses of the sheets being joined.

It is also an object to provide apparatus for forming a seam in multiple layers of thermoplastic film without materially reducing the original combined thicknesses of the layers.

It is a further object to provide improved means for pressing together multiple layers of thermoplastic being heat-seamed.

Other objects will be apparent from the following description and accompanying drawings.

In the drawings:

Fig. 1 is a plan view of apparatus constructed in accordance with and embodying the invention;

Fig. 2 is a side elevation of the apparatus partly in section and showing the air-chamber hood in the elevated position in dotted lines;

Fig. 3 is a detail view in cross-section of the heating bar construction; and

Fig. 4 is a detail view in section showing another embodiment of the invention.

The apparatus comprises a table 11 having upright supporting legs 12 and a working surface 13. Embedded in the working surface 13 is the heating bar 14 which houses electrical resistance heating elements 15. Suspended over table 11 is hydraulic cylinder 16, the piston of which is secured to hood 17 which is adapted to be lowered against the working surface 13 or a thermoplastic sheet 18 lying thereon so as to form an air-tight chamber 21 therewith. Hood 17 is provided with an air inlet port 22 to which is attached air hose 23. The weight of the hood 17 is sufficient to maintain the seal at the juncture 24 between the hood 17 and thermoplastic sheet 18. The slight depression in the thermoplastic sheets 18, 19 at the juncture 24 is not permanently set and disappears when the hood 17 is removed.

The product 29 formed in this apparatus has a seam 25 as shown in Fig. 3.

In another embodiment of the invention shown in Fig. 4 the heating bar 26 having resistance heating element 20 is secured by means of attaching bolts to hood 17 and is suspended over the thermoplastic sheets 18, 19 which are lying on working surface 13, when the hood is lowered during the heating cycle. The suspended heating bar is provided with a reflecting shield 27 which directs the heat to the surface of thermoplastic sheet 18 and in that area where the seam 28 is formed between thermoplastic sheets 18, 19.

In using the apparatus of the invention, two pieces of thermoplastic film or sheeting 18, 19 are placed on table 11 when the hood is in the elevated position as shown in dotted lines in Fig. 2.

Hydraulic cylinder 16 is then actuated to lower hood 17 until it rests upon the thermoplastic sheets 18, 19. Air is forced through line 23 into chamber 21 formed by hood 17 and the thermoplastic sheet covered table 11 until a pressure of about 50 p. s. i. is achieved. The sheets become wrinkle free and are pressed downwardly against the working surface 13. If necessary, the hood may be clamped down to table 11 to prevent loss of air pressure from the chamber 21; however such an expedient is not generally relied upon for the hood may be weighted or constructed heavily enough to assure a seal at the juncture 24 between thermoplastic sheet 18 and hood 17. The electrical resistance elements 15 are then energized to heat the circular heating bar 14 to a temperature sufficient to melt or fuse the sheets of thermoplastic material immediately above the heating bar 14 and form a seam 25 upon cooling, the seam being approximately the width of the heating bar 14 and, of course, circular in configuration as is the heating bar.

The air pressure is released after the thermoplastic has cooled and the hood 17 is raised by actuating hydraulic cylinder 16. The sheets of thermoplastic material are then pulled through the apparatus so that the product 29 having the finished seam 25 is exposed as shown in Fig. 1. If a continuous roll of sheet material is used, the apparatus will be refilled with a new portion of thermoplastic material as the product 29 is pulled from the apparatus and another cycle may be performed.

The product 29 can then be trimmed along the outer side of seam 25 by cutting with a die or in any other suitable manner.

Obviously, the size and shape of the seam and of the product may be varied widely. The pressure used in the air-chamber may be varied depending upon the thickness and pliability of the sheets to be seamed together. When two sheets of plasticized polyvinyl chloride about 0.015" in thickness are to be seamed together, it has been found necessary to have at least 50 p. s. i. pressure on the sheets to flatten the wrinkles and provide a seaming effect. Slightly greater pressures are necessary when sheets of greater thickness are to be seamed. Pressures greater than 50 p. s. i. may be used when treating even very thin films but such pressures are not generally used for reasons of practicability. The temperature to which the heating bar must be heated to provide a satisfactory seam will depend upon the softening point or melting point of the particular thermoplastic material employed, and may readily be determined in each case.

The particular source of heat is not critical so long as the heat is concentrated in the zone of the seam. Instead of air, any other fluid which is chemically inert to the thermoplastic material may be employed as a pressure medium, gaseous fluids being preferred for practical reasons.

Variations can be made without departing from the scope of the invention as defined in the following claims.

I claim:

1. Apparatus for heat-bonding multiple members of thermoplastic material comprising a chamber adapted to receive and continuously support said material along the inner surface of one continuous wall thereof, means for pressurizing said chamber to press said material against said inner surface of said continuous wall, and heating means adjacent said inner surface of said continuous wall for fusing preselected portions of said material while under pressure on said surface in said chamber.

2. Heat-seaming apparatus for thermoplastic material comprising a pressure chamber including a continuous flat plate and a cooperating hood therefor, means for moving said hood toward and from said continuous flat plate, said continuous flat plate being adapted to continuously support on its surface within said hood said material, means for admitting air under pressure into said pressure chamber, and means for heating localized zones of said material in said chamber, said heating means being a part of said flat plate.

3. Heat-seaming apparatus for thermoplastic material comprising a pressure chamber including a continuous flat plate and a cooperating hood therefor, means for moving said hood toward and from said continuous flat plate, said continuous flat plate being adapted to continuously support on its surface within said hood said material, means for admitting air under pressure into said pressure chamber, and means for heating localized zones of said material in said chamber, said heating means being suspended within said hood.

4. Apparatus for heat-seaming thermoplastic material sheets comprising a table having a continuous flat top adapted to continuously support said sheets, a hood adapted to be placed on said continuous flat top so as to cover said sheets and form a chamber with said continuous flat top, said sheets thereby lying on the inner surface of said continuous flat top, means for moving said hood to and from said continuous flat top, means adjacent said inner surface of said continuous flat top for heating localized zones of said sheets under said hood, and means for admitting air under pressure into said chamber.

5. Apparatus for heat-seaming thin sheets of thermoplastic material comprising a continuous flat plate with a heating bar embedded therein, said continuous flat plate adapted to continuously support said sheets, a hood adapted to form an air chamber in conjunction with said plate, hydraulic means for moving said hood to and from said plate, air inlet means for supplying air under pressure to said chamber, and means for heating said bar.

6. Apparatus for heat-sealing a plurality of thermoplastic members comprising a fluid pressure chamber adapted to receive said members including continuous means for rigidly continuously supporting said members in juxtaposed relation on the surface of said means within said chamber, means for introducing fluid under pressure into said chamber to press said members together, and heating means adjacent said surface of said continuous means for heating said members in the zone to be sealed while under pressure.

7. Method of heat-seaming multiple sheets of thermoplastic material comprising continuously supporting said sheets one atop another on a flat, continuous and rigid surface, pressing said sheets against said surface by means of fluid pressure exerted directly upon said sheets, heating adjacent said surface a localized zone through said pressed sheets until molten to form a seam joining said sheets, and allowing said seam to cool.

8. Method of forming a seam joining a plurality of thermoplastic material sheets comprising continuously backing said sheets with a flat, continuous and rigid plate, exerting fluid pressure upon said sheets to press them against the surface of said continuous, flat and rigid plate, and heating localized zones of said sheets while under pressure to form a joining seam therebetween.

9. In a method of forming a seam between layers of thermoplastic material by the application of heat and pressure, the step comprising pressing said layers against a continuous, rigid surface providing continuity of support by means of fluid under pressure.

10. In a method of forming a thick seam joining two sheets of thermoplastic material, the steps comprising exerting fluid pressure on said sheets to press said sheets against a continuous, rigid surface providing continuity of support, and heating said pressed sheets at localized zones where a seam is to be formed.

11. The method of heat-sealing together a plurality of thermoplastic sheets which comprises disposing said sheets in face-to-face contact with each other against a continuous, rigid member providing continuity of support, applying fluid pressure to press said sheets together and heating said members while under pressure along the zone to be sealed to a temperature above their softening point to seal said members together.

12. The method of heat-sealing together a plurality of sheets of thermoplastic material which comprises disposing said sheets in overlying relation upon a continuous, rigid supporting base providing continuity of support, applying fluid pressure to force said sheets together against the surface of said base, and heating said sheets from said base along the zone to be sealed to a temperature above the softening point of said thermoplastic material while maintaining said pressure.

13. The method of heat-sealing together a plurality of layers of thermoplastic material which comprises disposing said sheets in face-to-face contact upon a continuous, rigid supporting member providing continuity of support, heating said layers from the side opposite said supporting member along the zone to be sealed to a temperature above the softening point of said thermoplastic material, and applying fluid pressure to press said sheets together against said supporting member and bond them together along said heated zone.

14. The method of heat-seaming a plurality of sheets of thermoplastic material which comprises disposing said sheets in face-to-face contact on a continuous, rigid supporting member providing continuity of support, applying fluid pressure from the side opposite the supporting member over an area of said sheets to press them together against said support, and heating said sheets along a restricted zone within said area while under pressure to a temperature above the softening point to seal said sheets together.

15. Apparatus for forming a seam between a plurality of sheets of thermoplastic material comprising a continuous, rigid supporting member for continuously supporting said sheets in juxtaposed relation, means for applying fluid under pressure in contact with said sheets to press them against said supporting member, and heating means for heating a localized zone of said sheets on said supporting member while said supported sheets are under fluid pressure from said means for applying fluid under pressure to integrate said sheets and form a seam therebetween.

References Cited in the file of this patent

UNITED STATES PATENTS

| | | |
|---|---|---|
| 1,887,550 | Fix et al. | Nov. 15, 1932 |
| 2,183,599 | Welch | Dec. 19, 1939 |
| 2,233,570 | Absmeier | Mar. 4, 1941 |
| 2,268,262 | Miller | Dec. 30, 1941 |
| 2,351,058 | Marks | June 13, 1944 |
| 2,383,810 | Masculine | Aug. 28, 1945 |
| 2,404,165 | Carver | July 16, 1946 |
| 2,433,094 | Crowley | Dec. 23, 1947 |
| 2,470,852 | Irwin | May 24, 1949 |
| 2,481,602 | Lindh | Sept. 13, 1949 |
| 2,550,730 | Story | May 1, 1951 |